(12) United States Patent
Marking et al.

(10) Patent No.: US 7,396,491 B2
(45) Date of Patent: Jul. 8, 2008

(54) UV-EMITTING PHOSPHOR AND LAMP CONTAINING SAME

(75) Inventors: Gregory A. Marking, Sayre, PA (US); Thomas M. Synder, Laceyville, PA (US)

(73) Assignee: Osram Sylvania Inc., Danvers, MA (US)

( * ) Notice: Subject to any disclaimer, the term of this patent is extended or adjusted under 35 U.S.C. 154(b) by 337 days.

(21) Appl. No.: 11/278,823

(22) Filed: Apr. 6, 2006

(65) Prior Publication Data

US 2007/0235690 A1    Oct. 11, 2007

(51) Int. Cl.
*C09K 11/71* (2006.01)

(52) U.S. Cl. .............. 252/301.4 P; 313/486; 313/643

(58) Field of Classification Search ........... 252/301.4 P; 313/486, 643
See application file for complete search history.

(56) References Cited

U.S. PATENT DOCUMENTS

| | | | |
|---|---|---|---|
| 3,882,041 A | 5/1975 | Royce | |
| 4,757,233 A | 7/1988 | Peters et al. | |
| 6,246,171 B1 | 6/2001 | Vollkommer et al. | |
| 6,398,970 B1 | 6/2002 | Juestel et al. | |
| 6,469,435 B1 | 10/2002 | Seibold et al. | |
| 6,566,810 B1 | 5/2003 | Seibold et al. | |
| 6,734,631 B2 | 5/2004 | Juestel et al. | |

*Primary Examiner*—C. Melissa Koslow
(74) *Attorney, Agent, or Firm*—Robert F. Clark (57) ABSTRACT

A UV-emitting phosphor and lamp containing same are described. The phosphor is a praseodymium-activated pyrophosphate-based phosphor which may be represented by the general formula $(Ca_{2-x},Sr_x)P_2O_7:Pr$ where $0 \leq x \leq 2$. The phosphor is excitable by vacuum ultraviolet (VUV) radiation and in particular it may be excited by Xe-excimer discharges and thereby provide a Hg-free UV-emitting lamp. The phosphor exhibits a broad emission in the UVC region in the wavelength range from about 220 nm to about 280 nm with the peak emission occurring in the wavelength range from about 230 nm to about 240 nm. The emission characteristics of the phosphor may be varied depending on the ratio of Sr/Ca.

31 Claims, 10 Drawing Sheets

UV-EMITTING PHOSPHOR AND LAMP CONTAINING SAME

BACKGROUND OF THE INVENTION

The ultraviolet spectrum generally is divided into three regions: UVA (400 nm-320 nm), UVB (320 nm-290 nm) and UVC (290 nm-200 nm). The UVA and UVB regions are important for suntan lamps and medical phototherapy applications and the UVC is important for germicidal lamp applications.

In recent years, there has been increasing interest in germicidal lamps because of concerns about supplying potable drinking water, especially during natural disasters. In addition, there is a concurrent interest worldwide in reducing the widespread use of mercury because of its environmental impact. These two factors taken together have led to the development of mercury-free (Hg-free) germicidal lamps. One such water disinfecting device described in U.S. Pat. No. 6,398,970 is a Xe-plasma based vacuum ultraviolet (VUV) excited lamp which is coated with phosphors emitting in the germicidal range of about 220-280 nm.

In addition to water purification, UVC-emitting phosphors may be used in other germicidal applications such as the purification of surfaces and air and the medical sterilization of open wounds. Other potential uses beyond germicidal applications include medical phototherapy and photo-curing of UV-sensitive polymers and resins. Also, the use of UVC-emitting phosphors in low-pressure mercury fluorescent lighting has been reported to improve light output and reduce degradation due to 185 nm radiation. See, e.g., U.S. Pat. No. 6,734,631.

SUMMARY OF THE INVENTION

The present invention is a novel UV-emitting phosphor and lamp containing same. The phosphor is a praseodymium-activated pyrophosphate-based phosphor which may be represented by the general formula $(Ca_{2-x},Sr_x)P_2O_7$:Pr where $0 \leq x \leq 2$. As the formula indicates, the composition of the phosphor covers the entire range of compositions from $Ca_2P_2O_7$:Pr to $Sr_2P_2O_7$:Pr. In between, there exists a mixture of the $Sr_2P_2O_7$:Pr and $Ca_2P_2O_7$:Pr phases in an apparent solid solution.

The phosphor of this invention is excitable by vacuum ultraviolet (VUV) radiation and in particular it may be excited by the 172 nm radiation emitted by Xe-excimer discharges. The phosphor exhibits a broad emission in the UVC region in the wavelength range from about 220 nm to about 280 nm with the peak emission occurring in the wavelength range from about 230 nm to about 240 nm. The emission characteristics of the phosphor may be varied depending on the ratio of Sr/Ca.

In a preferred embodiment, the phosphor is formulated to have a slight excess of the pyrophosphate anion relative to the total cation amount. Such slight deviations in stoichiometry are an idea common to many phosphors where a small excess of anionic species is used in the formulated phosphor blend and results in improved brightness for the fired phosphor material. It is also preferred to include a 1+ metal cation, preferably $Na^+$, to provide charge balancing for the $Pr^{3+}$ activator.

Such formulation adjustments are known for cerium-activated calcium pyrophosphate phosphors. For example, U.S. Pat. No. 4,757,233 describes a Ce-activated calcium pyrophosphate phosphor represented by the formula $Ca_{(2-x-y)}(NSF)_wCe_xNa_yP_2O_7$ where NSF is the nonstoichiometric factor, and w ranges from 0 to 0.1, x ranges from 0.05 to 0.20, and y ranges from 0.05 to 0.20. In this case, the amount of $Na^+$ is approximately equal to the amount of $Ce^{3+}$ in the phosphor for overall charge balance.

Accordingly, in a more preferred embodiment, the phosphor of this invention may be represented by the formula $Ca_{(2-w-y-z)}Sr_xA_yPr_zP_2O_7$ where: A is a 1+ metal cation, preferably $Na^+$; w is a nonstoichiometric factor which ranges from 0 to about 0.1 and is more preferably equal to about 0.06; x ranges from 0 to 2-w-y-z; y ranges from 0 to about 0.25 and more preferably from z−0.01 to z+0.01; and z ranges from greater than 0 to about 0.12 and more preferably from about 0.02 to about 0.08. The 1+ metal cation is included in the formulation primarily for charge balancing. It is therefore preferred that the amount of the 1+ metal cation equal the amount of the Pr activator, i.e., y=z.

Both $Ca_2P_2O_7$ and $Sr_2P_2O_7$ are known to have β- to α-phase transitions. These transitions occur at approximately 1140° C. and 775° C. respectively, with the α-phase being a monoclinic structure while the β-phase is tetragonal. Both phases may be activated with praseodymium to form the UV-emitting phosphor of this invention. Moreover, the phosphor may be a mixture of the α- and β-phases which each have different emission characteristics. Preferred phosphors are α-$Ca_2P_2O_7$:Pr, β-$Ca_2P_2O_7$:Pr, and α-$Sr_2P_2O_7$:Pr.

For $Ca_2P_2O_7$:Pr phosphors (x=0), a preferred formula is: $Ca_{(2-w-y-z)}A_yPr_zP_2O_7$ where: A is a 1+ metal cation, preferably $Na^+$; w ranges from 0 to about 0.1 and is more preferably equal to about 0.06; y ranges from 0 to about 0.25 and more preferably from z−0.01 to z+0.01; and z ranges from about 0.04 to about 0.12 for β-$Ca_2P_2O_7$:Pr and from about 0.02 to about 0.08 for α-$Ca_2P_2O_7$:Pr. More preferably, y=z for both phases.

For $Sr_2P_2O_7$:Pr phosphors (x=2), a preferred formula is: $Sr_{(2-w-y-z)}A_yPr_zP_2O_7$ where: A is a 1+ metal cation, preferably $Na^+$; w ranges from 0 to about 0.1 and is more preferably equal to about 0.06; y ranges from 0 to about 0.25 and more preferably from z−0.01 to z+0.01; and z ranges from about 0.03 to about 0.08. The α-phase is preferred for the strontium pyrophosphate phosphors. For charge balancing, it is more preferred that y=z.

DETAILED DESCRIPTION OF THE INVENTION

For a better understanding of the present invention, together with other and further objects, advantages and capabilities thereof, reference is made to the following disclosure and appended claims taken in conjunction with the above-described drawings.

$Pr^{3+}$ may substitute for $Ce^{3+}$ in many materials because they are chemically similar rare earth ions with similar radii. However, the electronic states of $Pr^{3+}$ and $Ce^{3+}$ are quite different and the optical properties of the same phosphor lattices with these two different activator ions are typically quite different. As examples, $LaPO_4$:Ce and $YPO_4$:Ce are good UVB- and UVA-emitting phosphors, respectively, while $LaPO_4$:Pr and $YPO_4$:Pr are good UVC-emitting phosphors. The same applies for the $Ca_2P_2O_7$ system. The Ce-activated phosphor described in U.S. Pat. No. 4,757,233 emits at about 330 nm when stimulated by 254 nm radiation whereas when $Pr^{3+}$ is substituted as the activator ion the emission occurs at about 230 nm in response to excitation by 172 nm radiation.

As described previously, $Ca_2P_2O_7$ and $Sr_2P_2O_7$ are known to have β- to α-phase transitions at approximately 1140° C. and 775° C. respectively, with the α-phase being a monoclinic structure while the β-phase is tetragonal. Previously, the α-phase was reported as an orthorhombic structure, but more recently the structure has been determined to be monoclinic with a very small deviation from the orthogonal orthorhombic lattice.

Figure 1:
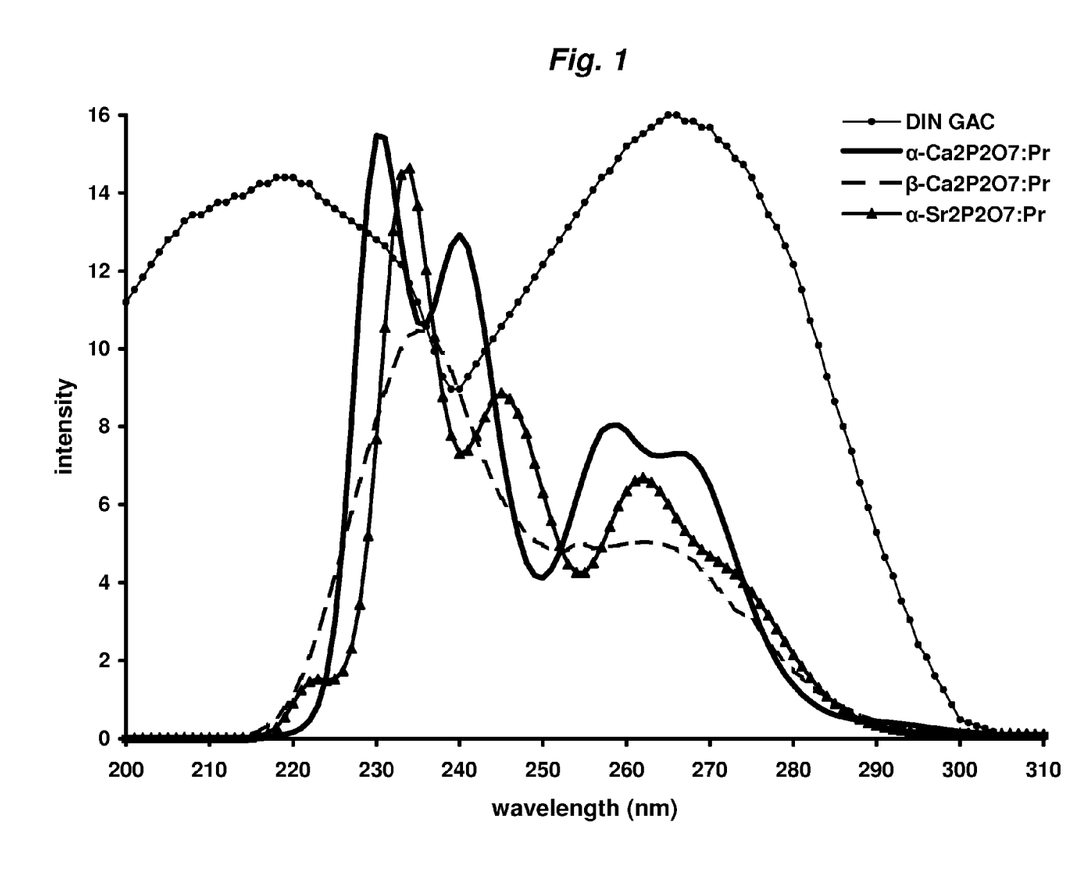
FIG. 1 is a graph of the UVC emission spectra of α-$Ca_2P_2O_7$:Pr, β-$Ca_2P_2O_7$:Pr and α-$Sr_2P_2O_7$:Pr phosphors under excitation by 172 nm radiation compared to the DIN germicidal activity curve (GAC).

The Ce-activated calcium pyrophosphate disclosed in U.S. Pat. No. 4,757,233 is a β-phase material and is commonly fired at 1000° C. The same raw material blends fired at 1200° C. will form an β-phase material. The β-phase $Ca_2P_2O_7$:Ce phosphor has a single broad emission peak centered at ~335 nm under 254 nm radiation, which appears to be at least two separate emission peaks which overlap. The α-phase $Ca_2P_2O_7$:Ce phosphor exhibits a less intense emission under 254 nm radiation with two distinct peaks centered at 326 nm and 344 nm. Similar behavior is observed for $Ca_2P_2O_7$:Pr phosphors except the higher temperature α-phase phosphor has a much stronger emission intensity than the lower temperature β-phase phosphor under vacuum ultraviolet radiation. In particular, β-$Ca_2P_2O_7$:Pr has two broad peaks centered at approximately 235 nm and 263 nm, while α-$Ca_2P_2O_7$:Pr has four distinct emission peaks centered at approximately 231 nm, 240 nm, 258 nm, and 267 nm. The UVC emission spectra of these phosphors is shown in FIG. 1 under 172 nm excitation. Also depicted is the DIN germicidal activity curve (GAC) for the UV inactivation of *E. Coli* bacteria. DIN 5031-10, Strahlungsphysik im optischen bereich und lichttechnik, Deutsches Insitut für Normung (1996).

As expected from the phase transition temperature, α-$Ca_2P_2O_7$:Pr is formed in a reducing atmosphere at temperatures greater than about 1140° C., while β-$Ca_2P_2O_7$:Pr is formed in a reducing atmosphere at temperatures less than about 1140° C. Similarly, α-$Sr_2P_2O_7$:Pr is formed in reducing atmospheres between 1000° C. and 1200° C. As shown in FIG. 1, this phosphor also has an intense emission spectrum under VUV excitation with peaks centered at approximately 234 nm, 245 nm, and 262 nm and much weaker shoulders at approximately 222 nm and 273 nm. In contrast, β-$Sr_2P_2O_7$ is reported to form at temperatures under 775° C., but $Sr_2P_2O_7$:Pr phosphors prepared at 750° C. exhibited only the emission spectra of α-$Sr_2P_2O_7$:Pr.

Figure 5:
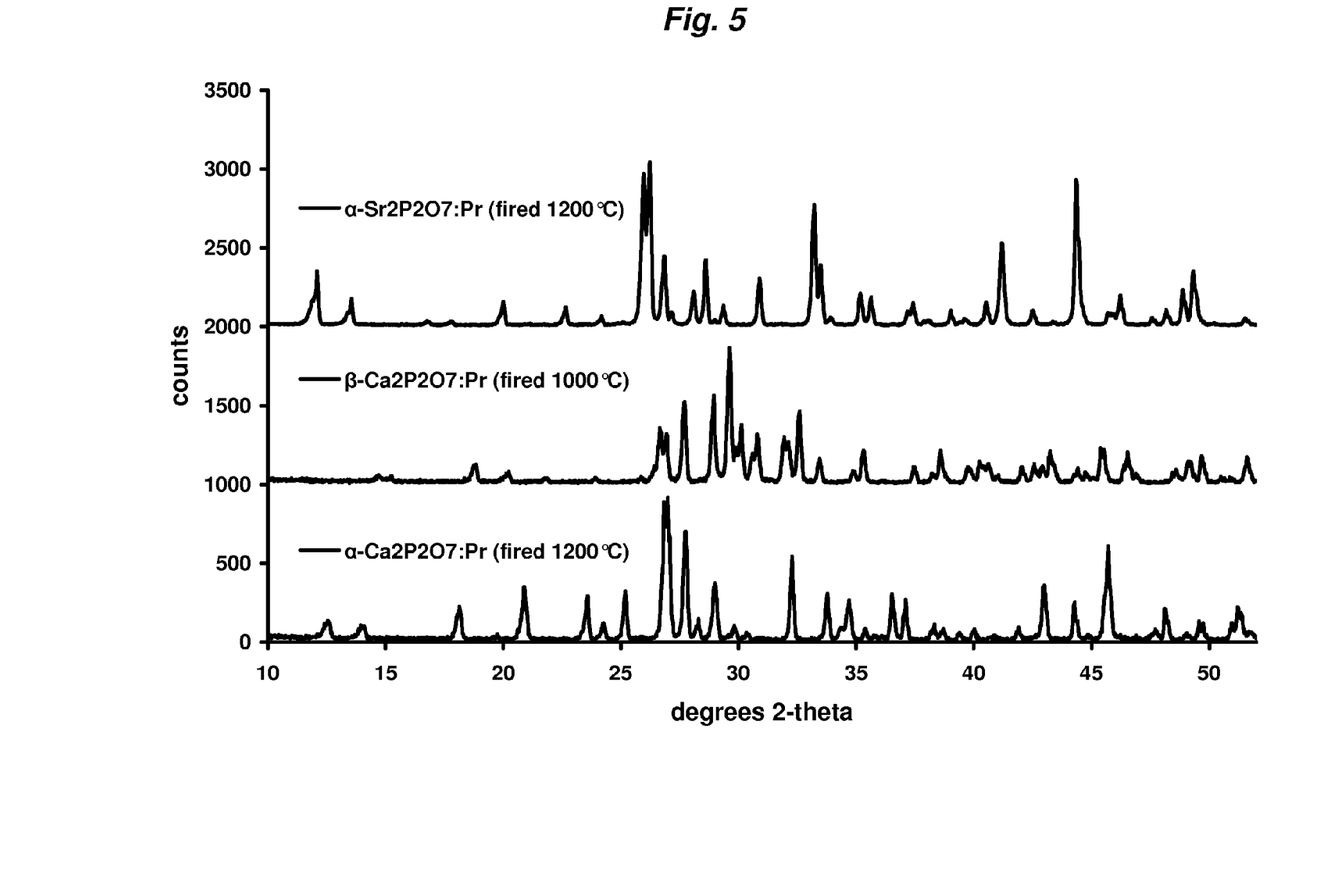
FIG. 5 shows the x-ray diffraction patterns of α-$Ca_2P_2O_7$:Pr, β-$Ca_2P_2O_7$:Pr, and α-$Sr_2P_2O_7$:Pr.

The phase transition temperature of these materials is, in part, dependent upon the formulation of the reactant blend. Mixtures of the two $Ca_2P_2O_7$:Pr phases may be prepared at temperatures ranging from 1050° C. to 1150° C. However, $(Ca_{2-x}Sr_x)P_2O_7$:Pr phosphors (where x>0.4) tend to be primarily α-phase even when fired at 1000° C. When x≦0.4, β-phase is detected. The x-ray diffraction patterns of α-$Ca_2P_2O_7$:Pr, β-$Ca_2P_2O_7$:Pr, and α-$Sr_2P_2O_7$:Pr are shown in FIG. 5.

Figure 2:
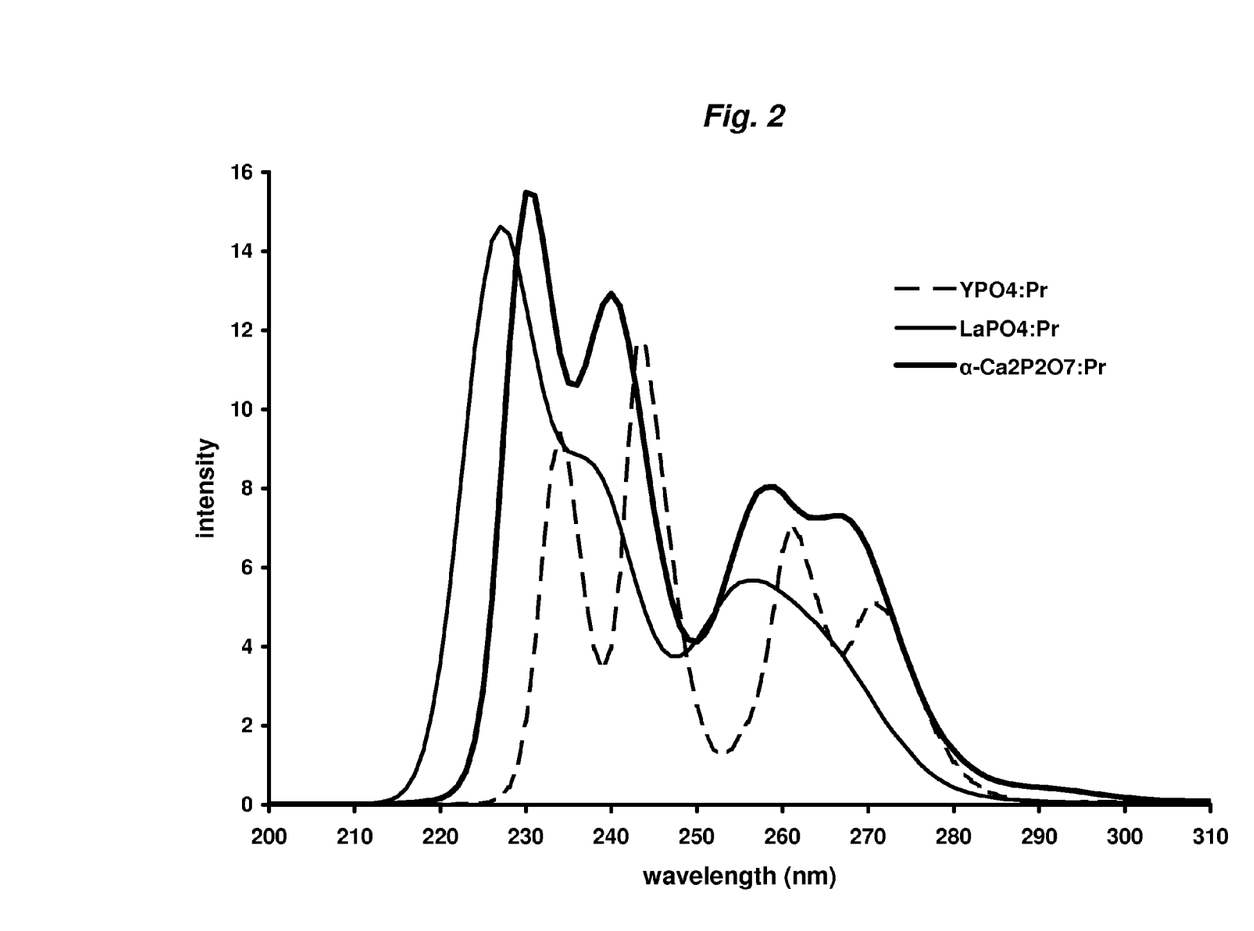
FIG. 2 is a graph comparing the UVC emission spectra of α-$Ca_2P_2O_7$:Pr, $LaPO_4$:Pr, and $YPO_4$:Pr phosphors under excitation by 172 nm radiation.
Figure 3:
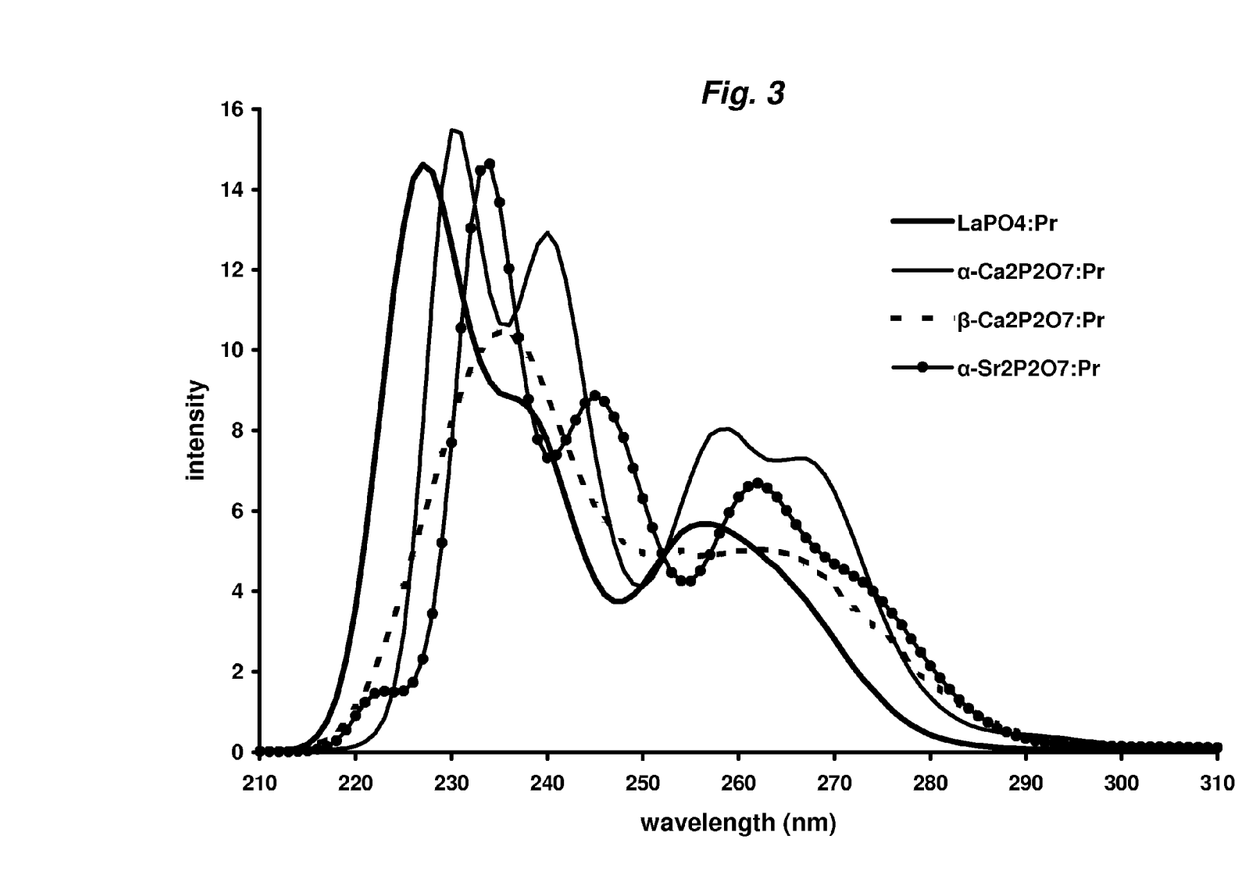
FIG. 3 compares the UVC emission spectra of α-$Ca_2P_2O_7$:Pr, β-$Ca_2P_2O_7$:Pr and α-$Sr_2P_2O_7$:Pr phosphors with $LaPO_4$:Pr under excitation by 172 nm radiation
Figure 4:
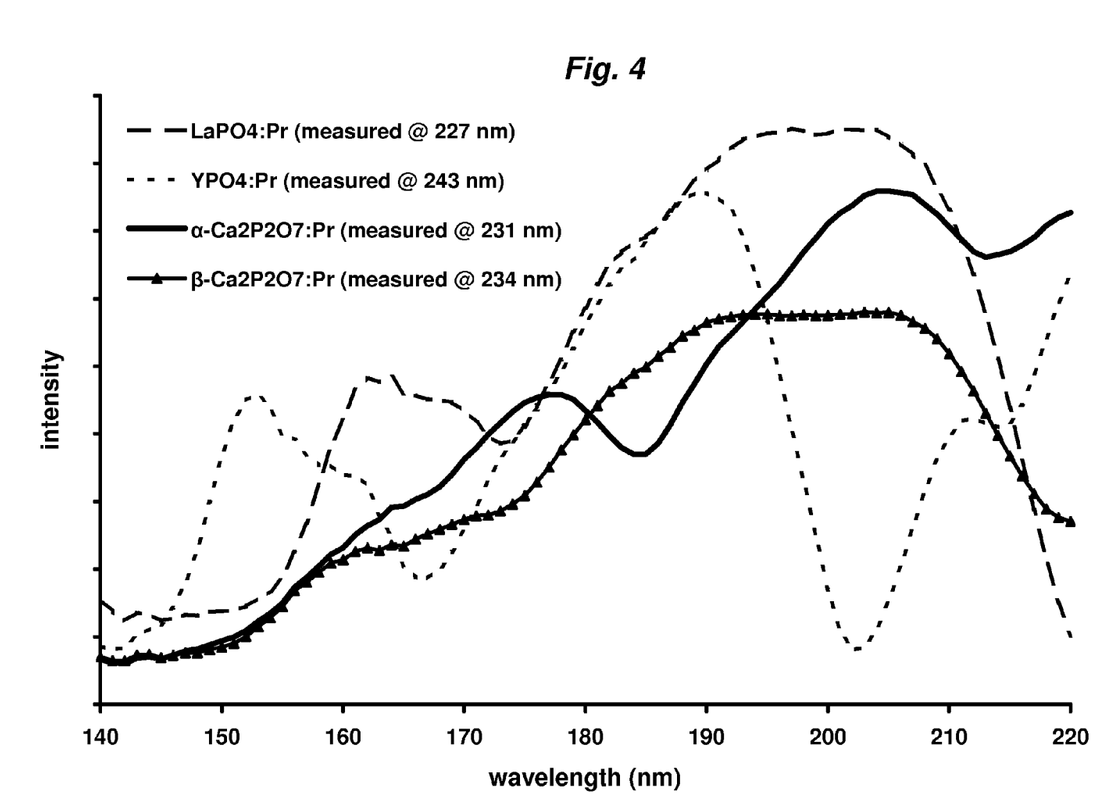
FIG. 4 shows the excitation spectra of the UVC-emitting phosphors α-$Ca_2P_2O_7$:Pr, β-$Ca_2P_2O_7$:Pr, $LaPO_4$:Pr, and $YPO_4$:Pr.

The phosphors of this invention have emission spectra that are comparable to other UVC-emitting phosphors and, in particular, $LaPO_4$:Pr and $YPO_4$:Pr. For example, α-$Ca_2P_2O_7$:Pr phosphors have been prepared with an integrated UVC emission intensity of up to 127% that of $LaPO_4$:Pr under 172 nm excitation radiation. Similarly, α-$Sr_2P_2O_7$:Pr phosphors have been prepared with up to 105% the UVC emission intensity of $LaPO_4$:Pr and α-$(Ca,Sr)_2P_2O_7$:Pr phosphors have attained up to 116% the emission intensity of $LaPO_4$:Pr. FIG. 2 compares the emission spectra of $LaPO_4$:Pr and $YPO_4$:Pr with α-$Ca_2P_2O_7$:Pr under excitation by 172 nm radiation. FIG. 3 compares the UVC emission spectra of α-$Ca_2P_2O_7$:Pr, β-$Ca_2P_2O_7$:Pr and α-$Sr_2P_2O_7$:Pr phosphors with $LaPO_4$:Pr under 172 nm excitation. FIG. 4 shows the excitation spectra of α-$Ca_2P_2O_7$:Pr, β-$Ca_2P_2O_7$:Pr, $LaPO_4$:Pr and $YPO_4$:Pr. To obtain the excitation spectra in FIG. 4, the intensities of the indicated emission wavelengths were measured as the excitation wavelength was varied from 140 nm to 220 nm.

EXAMPLES 1-31

$Ca_2P_2O_7$:Pr Phosphors $Ca_2P_2O_7$:Pr may be prepared by thoroughly dry blending the appropriate reactants, then firing the blended materials in a reducing atmosphere, preferably for 2-4 hours at 1000° C.-1200° C. in a 5% $H_2$-95% $N_2$ atmosphere The reactants preferably include calcium hydrogen phosphate, $(CaHPO_4)$, diammonium hydrogen phosphate $((NH_4)_2HPO_4)$, sodium carbonate $(Na_2CO_3)$, and praseodymium oxide $(Pr_4O_7)$. The fired cakes may be softened by soaking for 2-12 hours in de-ionized water and then wet-sieved −60 mesh and dried. Alternatively, the dry fired cakes may be broken into smaller pieces, ground and then dry sifted −60 mesh. The phosphor powder can be wet-milled to the appropriate size using a ball-milling technique with a minimal loss in brightness due to particle damage.

Examples 1-4 were prepared by thoroughly blending the reactants in a 500 ml plastic bottle using roll-blending and paint-shaking techniques. All reactants were assayed and the diammonium hydrogen phosphate (DAP) was ground and screened −60 mesh before use. An ~75 g amount of each reactant blend was loaded into an alumina crucible. The crucibles were then placed in silica boats and pushed through a tube furnace at 1000° C. under a reducing 5% $H_2$-95% $N_2$ atmosphere with a total time in the hot zone of 2 hours. The fired phosphors were cooled within the tube furnace, then removed, broken into pieces, ground, and screened −60 mesh. UVC emission spectra of the phosphors under 172 nm excitation radiation were measured using an Acton SpectraPro-2500i monochromator/spectrograph with a deuterium light source and a VM-504 vacuum monochromator.

Further ~75 g amounts of the same reactant blends were fired at 1150° C. using the same method as above and processed in the same fashion. Table 1 lists the mole ratios and weights of the reactants for Examples 1-4. Table 2 provides the integrated UVC emission intensities of the phosphors between 210 nm-310 nm in response to excitation by 172 nm radiation. The integrated emission intensities are given relative to $LaPO_4$:Pr and $YPO_4$:Pr phosphors which were used as controls.

TABLE 1

| Reactant | | $CaHPO_4$ | DAP | $Na_2CO_3$ | $Pr_4O_7$ |
|---|---|---|---|---|---|
| Example 1 | mole ratio | 1.90 | 0.10 | 0.010 | 0.005 |
| | weight (g) | 182.87 | 9.28 | 0.74 | 2.36 |
| Example 2 | mole ratio | 1.86 | 0.14 | 0.020 | 0.010 |
| | weight (g) | 179.02 | 12.99 | 1.48 | 4.73 |
| Example 3 | mole ratio | 1.78 | 0.22 | 0.040 | 0.020 |
| | weight (g) | 171.32 | 20.42 | 2.97 | 9.46 |
| Example 4 | mole ratio | 1.70 | 0.30 | 0.060 | 0.030 |
| | weight (g) | 163.62 | 27.84 | 4.45 | 14.19 |

TABLE 2

| | | Relative UVC Intensity under 172 nm | | | |
|---|---|---|---|---|---|
| | moles | Fired at 1000° C. | | Fired at 1150° C. | |
| | Pr/mole phosphor | relative to $LaPO_4$:Pr | relative to $YPO_4$:Pr | relative to $LaPO_4$:Pr | relative to $YPO_4$:Pr |
| Example 1 | 0.02 | 87% | 123% | 112% | 158% |
| Example 2 | 0.04 | 99% | 140% | 118% | 167% |
| Example 3 | 0.08 | 102% | 144% | 109% | 154% |
| Example 4 | 0.12 | 96% | 136% | 95% | 134% |

Examples 5-8 were prepared, fired at 1150° C., processed, and analyzed in the same fashion as Examples 1-4. Table 3 lists the reactant mole ratios and weights for Examples 5-8. Table 4 provides the activator, anion, and cation levels in addition to the integrated UVC emission intensities under 172 nm excitation between 210 nm-310 nm relative to a $LaPO_4$:Pr control. In these examples, lower levels of the $Pr^{3+}$ activator were investigated and the amount of DAP was kept at 0.15 moles to better flux the phosphor formation. A preferred stoichiometry for the phosphor formulation is 1.00 moles of pyrophosphate anion (2.00 moles P) to a slight deficiency of 1.94 moles of cation ($Ca^{2+}+Na^{+}+Pr^{3+}$). Example 6 prepared with 0.02 moles of $Pr^{3+}$ had an excess of 0.025 moles of $[P_2O_7]^{4-}$ and was significantly inferior in brightness relative to Example 1, which was also prepared with 0.02 moles of $Pr^{3+}$, but had no excess of $[P_2O_7]^{4-}$ anion.

TABLE 3

| Reactant | | $CaHPO_4$ | DAP | $Na_2CO_3$ | $Pr_4O_7$ |
|---|---|---|---|---|---|
| Example 5 | mole ratio | 1.92 | 0.15 | 0.005 | 0.0025 |
| | weight (g) | 137.27 | 10.34 | 0.28 | 0.88 |
| Example 6 | mole ratio | 1.90 | 0.15 | 0.010 | 0.005 |
| | weight (g) | 135.84 | 10.34 | 0.55 | 1.76 |
| Example 7 | mole ratio | 1.88 | 0.15 | 0.015 | 0.0075 |
| | weight (g) | 134.41 | 10.34 | 0.83 | 2.63 |
| Example 8 | mole ratio | 1.86 | 0.15 | 0.020 | 0.010 |
| | weight (g) | 132.98 | 10.34 | 1.10 | 3.51 |

TABLE 4

| | moles/mole of phosphor | | | UVC intensity under 172 nm |
|---|---|---|---|---|
| | Pr | total $[P_2O_7]^{4-}$ | total ($Ca^{2+}+Na^{+}+Pr^{3+}$) | relative to $LaPO_4$:Pr |
| Example 5 | 0.01 | 1.035 | 1.94 | 60% |
| Example 6 | 0.02 | 1.025 | 1.94 | 82% |
| Example 7 | 0.03 | 1.015 | 1.94 | 100% |
| Example 8 | 0.04 | 1.005 | 1.94 | 110% |
| Example 1 | 0.02 | 1.000 | 1.94 | 112% |
| Example 2 | 0.04 | 1.000 | 1.94 | 118% |

Examples 9-13 were prepared in a similar fashion as the previous examples to more fully investigate the effects of the firing temperature on $Ca_2P_2O_7$:Pr. A single large amount of the reactant blend was prepared with 0.045 moles Pr/mole phosphor. Table 5 below lists the reactant mole ratios and weights. Separate 75 g amounts of the blend were fired at temperatures ranging from 1000° C. to 1200° C. Table 6 provides the results of x-ray diffraction (XRD) phase analyses and the integrated UVC emission intensities of $Ca_2P_2O_7$:Pr phosphors between 210 nm-310 nm, relative to $LaPO_4$:Pr and $YPO_4$:Pr controls, under 172 nm excitation radiation. Table 7 also provides the maximum peak wavelengths and maximum peak intensities of the $Ca_2P_2O_7$:Pr phosphors, relative to $LaPO_4$:Pr, under 172 nm excitation.

The XRD results show that the phosphors undergo a phase shift as the firing temperature increases: from entirely β-phase at 1000° C., to a mixture of β- and α-phases between 1050° C. to 1150° C., to entirely α-phase at 1200° C. The UVC emission data indicates that for 172 nm excitation it is preferred to have at least some of the α-phase present to yield a higher UVC emission.

TABLE 5

| Reactant | | $CaHPO_4$ | DAP | $Na_2CO_3$ | $Pr_4O_7$ |
|---|---|---|---|---|---|
| Examples 9-13 | mole ratio | 1.85 | 0.171 | 0.0225 | 0.0113 |
| | weight (g) | 499.70 | 44.61 | 4.69 | 14.94 |

TABLE 6

| | | | | UVC intensity under 172 nm radiation | |
|---|---|---|---|---|---|
| | Firing temp. | XRD analysis | | relative to | relative to |
| | | α-phase | β-phase | $LaPO_4$:Pr | $YPO_4$:Pr |
| Example 9 | 1000° C. | None | Major | 96% | 136% |
| Example 10 | 1050° C. | Trace | Major | 102% | 144% |
| Example 11 | 1100° C. | Minor | Major | 110% | 154% |
| Example 12 | 1150° C. | Major | Major | 114% | 161% |
| Example 13 | 1200° C. | Major | None | 112% | 158% |

TABLE 7

| | Firing temp. | XRD analysis | UVC Peak Emission under 172 nm | UVC Peak Intensity under 172 nm radiation relative to $LaPO_4$:Pr |
|---|---|---|---|---|
| Example 9 | 1000° C. | β-phase | 234 nm | 73% |
| Example 10 | 1050° C. | β + (trace α) | 235 nm | 78% |
| Example 11 | 1100° C. | β + (minor α) | 235 nm | 83% |

TABLE 7-continued

|  | Firing temp. | XRD analysis | UVC Peak Emission under 172 nm | UVC Peak Intensity under 172 nm radiation relative to LaPO$_4$:Pr |
|---|---|---|---|---|
| Example 12 | 1150° C. | β + α | 230 nm | 99% |
| Example 13 | 1200° C. | α-phase | 230 nm | 103% |
| LaPO4:Pr | NA | NA | 227 nm | 100% |
| YPO4:Pr | NA | NA | 83 nm | 83% |

Examples 14-19 were prepared, fired at 1100° C. and 1200° C., processed, and analyzed in the same fashion as the previous samples. The Pr$^{3+}$ activator level was kept at 0.04 moles Pr/mole phosphor in each case, but the pyrophosphate anion, [P$_2$O$_7$]$^{4-}$, and Na$^+$ levels were varied to investigate the effect of changing the anion/cation ratio from the preferred ratio of 1.00/1.94 and to determine the effect of altering the charge balance (moles Na$^+$ to moles Pr$^{3+}$). Table 8 below lists the reactant mole ratios and weights for Examples 14-19. Table 9 provides the pyrophosphate anion, Na$^+$, and total cation levels as well as the integrated UVC emission intensities between 210 nm-310 nm, relative to a LaPO$_4$:Pr control, under 172 nm excitation.

Figure 6:
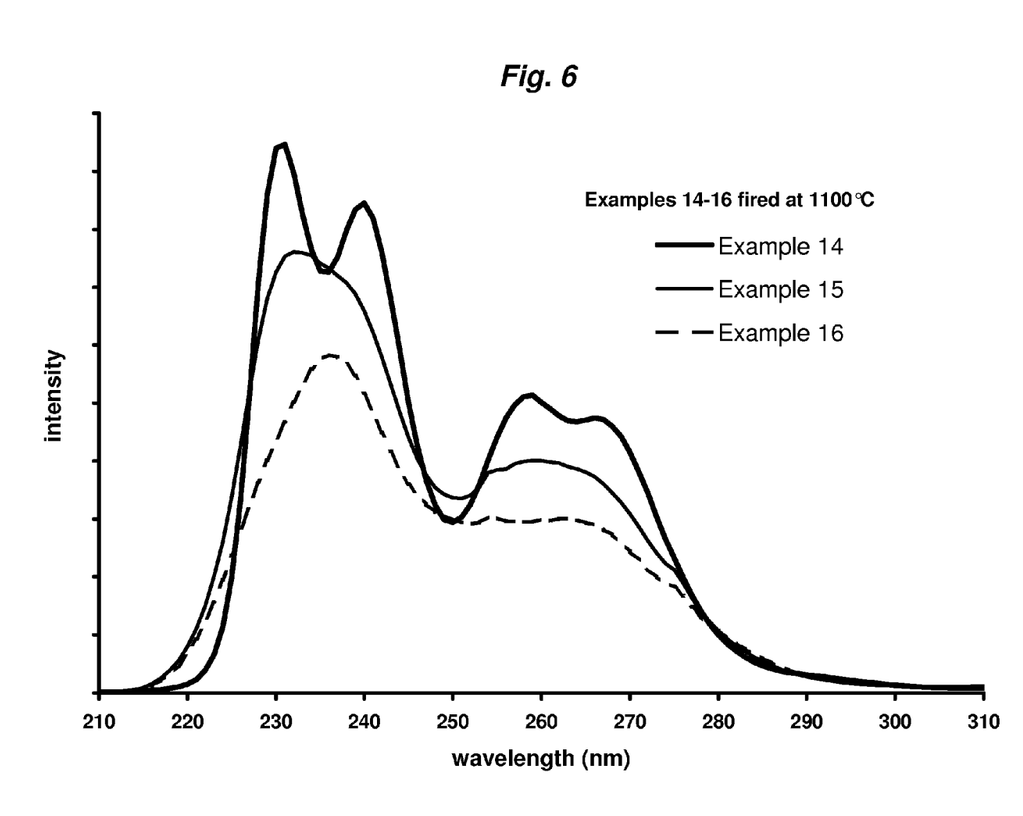
FIG. 6 is a graph of the UVC emission spectra of Examples 14-16 under excitation by 172 nm radiation.

FIG. 6 shows the emission spectra of Examples 14-16 which were fired at 1100° C. Example 14 exhibited the emission characteristics of the high-temperature α-phase when fired at 1100° C. Example 15 exhibited characteristics of both the α-phase and low-temperature β-phase when fired at 1100° C. Examples 16-19 exhibited characteristics primarily of the β-phase when fired at 1100° C. All Examples 14-19 exhibited the spectral character of the high-temperature α-phase when fired at 1200° C. In addition, the phosphors made without Na$^+$ for charge balancing (Examples 18 and 19) were significantly less intense than the charge-balanced phosphors. The charge-balanced phosphor with greatest UVC emission intensity (Example 14) was made with the preferred 1.00/1.94 anion/cation ratio.

TABLE 8

| Reactant | | CaHPO$_4$ | DAP | Na$_2$CO$_3$ | Pr$_4$O$_7$ |
|---|---|---|---|---|---|
| Example 14 | mole ratio | 1.86 | 0.14 | 0.02 | 0.010 |
|  | weight (g) | 132.98 | 9.65 | 1.10 | 3.51 |
| Example 15 | mole ratio | 1.86 | 0.17 | 0.02 | 0.010 |
|  | weight (g) | 132.98 | 11.72 | 1.10 | 3.51 |
| Example 16 | mole ratio | 1.86 | 0.11 | 0.02 | 0.010 |
|  | weight (g) | 132.98 | 7.58 | 1.10 | 3.51 |
| Example 17 | mole ratio | 1.86 | 0.08 | 0.02 | 0.010 |
|  | weight (g) | 132.98 | 5.52 | 1.10 | 3.51 |
| Example 18 | mole ratio | 1.90 | 0.10 | 0 | 0.010 |
|  | weight (g) | 135.84 | 6.89 | 0 | 3.51 |
| Example 19 | mole ratio | 1.86 | 0.14 | 0 | 0.010 |
|  | weight (g) | 132.98 | 9.65 | 0 | 3.51 |

TABLE 9

Spectral character of Ca$_2$P$_2$O$_7$:Pr phosphors with constant 0.04 Pr level

|  | moles/mole of phosphor | | | Phase (fired at 1100° C.) | UVC Intensity under 172 nm relative to LaPO$_4$:Pr | |
|---|---|---|---|---|---|---|
|  | total [P$_2$O$_7$]$^{4-}$ | Na$^+$ | total (Ca$^{2+}$+ Na$^+$+ Pr$^{3+}$) |  | Fired at 1100° C. | Fired at 1200° C. |
| Example 14 | 1.00 | 0.04 | 1.94 | α | 125% | 126% |
| Example 15 | 1.015 | 0.04 | 1.94 | α + β | 113% | 113% |
| Example 16 | 0.985 | 0.04 | 1.94 | β | 87% | 120% |
| Example 17 | 0.97 | 0.04 | 1.94 | β | 83% | 110% |
| Example 18 | 1.00 | 0 | 1.94 | β | 13% | 53% |
| Example 19 | 1.00 | 0 | 1.90 | β | 24% | 79% |

Examples 20-27 were prepared, fired at 1100° C. and 1200° C., processed, and analyzed in the same fashion as the previous samples. The Pr$^{3+}$ activator level was varied in order to more fully determine the preferred activator levels for the Ca$_2$P$_2$O$_7$:Pr phosphors. The Na$^+$ levels were kept equivalent to the Pr$^{3+}$ levels for charge balancing purposes. Table 10 below lists the reactant mole ratios and weights for Examples 20-27. Table 11 provides the Pr activator level and the integrated UVC emission intensities between 210 nm-310 nm, relative to LaPO$_4$:Pr and YPO$_4$:Pr controls, under 172 nm excitation.

Example 20 emitted with the characteristics of the low-temperature β-phase when fired at 1100° C. Example 21 exhibited emission characteristics of both β-phase and high-temperature α-phase when fired at 1100° C. Examples 22-27 exhibited characteristics primarily of the α-phase when fired at 1100° C. All Examples 20-27 exhibited the spectral character of the high-temperature α-phase when fired at 1200° C. The most intense UVC emission was obtained with 0.05 moles Pr/mole phosphor for the phosphors formed at 1100° C. whereas for the phosphors formed at 1200° C. the most intense emission was obtained at 0.03 mole Pr/mole phosphor.

TABLE 10

| Reactant | | CaHPO$_4$ | DAP | Na$_2$CO$_3$ | Pr$_4$O$_7$ |
|---|---|---|---|---|---|
| Example 20 | mole ratio | 1.88 | 0.12 | 0.015 | 0.0075 |
|  | weight (g) | 134.41 | 8.27 | 0.83 | 2.63 |
| Example 21 | mole ratio | 1.86 | 0.14 | 0.020 | 0.010 |
|  | weight (g) | 132.98 | 9.65 | 1.10 | 3.51 |
| Example 22 | mole ratio | 1.84 | 0.16 | 0.025 | 0.0125 |
|  | weight (g) | 131.55 | 11.03 | 1.38 | 4.39 |
| Example 23 | mole ratio | 1.82 | 0.18 | 0.030 | 0.015 |
|  | weight (g) | 130.12 | 12.41 | 1.65 | 5.27 |

TABLE 10-continued

| | Reactant | CaHPO$_4$ | DAP | Na$_2$CO$_3$ | Pr$_4$O$_7$ |
|---|---|---|---|---|---|
| Example 24 | mole ratio | 1.80 | 0.20 | 0.035 | 0.0175 |
| | weight (g) | 128.69 | 13.79 | 1.93 | 6.15 |
| Example 25 | mole ratio | 1.78 | 0.22 | 0.040 | 0.020 |
| | weight (g) | 127.26 | 15.17 | 2.20 | 7.03 |
| Example 26 | mole ratio | 1.76 | 0.24 | 0.045 | 0.0225 |
| | weight (g) | 125.83 | 16.55 | 2.48 | 7.90 |
| Example 27 | mole ratio | 1.74 | 0.26 | 0.050 | 0.025 |
| | weight (g) | 124.40 | 17.92 | 2.76 | 8.78 |

TABLE 11

| | moles | Relative UVC Intensity under 172 nm radiation | | | |
|---|---|---|---|---|---|
| | | Fired at 1100° C. | | Fired at 1200° C. | |
| | Pr/mole phosphor | relative. to LaPO$_4$:Pr | relative to YPO$_4$:Pr | relative to LaPO$_4$:Pr | relative to YPO$_4$:Pr |
| Example 20 | 0.03 | 102% | 144% | 127% | 179% |
| Example 21 | 0.04 | 108% | 153% | 126% | 178% |
| Example 22 | 0.05 | 126% | 179% | 124% | 175% |
| Example 23 | 0.06 | 119% | 168% | 122% | 172% |
| Example 24 | 0.07 | 112% | 159% | 118% | 165% |
| Example 25 | 0.08 | 110% | 156% | 113% | 159% |
| Example 26 | 0.09 | 110% | 156% | 106% | 148% |
| Example 27 | 0.10 | 104% | 148% | 107% | 149% |

It is apparent from the results for Examples 14-27 that the reactant blend formulation affects the transition temperature between the low-temperature β- and high-temperature α-phases. The changes in formulation include Pr$^{3+}$ activator level (Pr$_4$O$_7$), DAP reactant and flux level, CaHPO$_4$ reactant level, and the Na$^+$ (Na$_2$CO$_3$) charge balance level. However, it is not readily apparent from the data which formulation change acts as the primary factor in controlling the transition temperature.

Examples 28-31 were prepared, fired at 1100° C. and 1200° C., processed, and analyzed in the same fashion as the previous samples. These examples were prepared to investigate the effects of varying the amount of DAP (diammonium hydrogen phosphate) used as a reactant and flux in this phosphor system. The preferred stoichiometry of 1.0 moles of pyrophosphate anion, [P$_2$O$_7$]$^{4-}$, to 1.94 moles of total cation was used along with two levels of Pr$^{3+}$ activator (0.03 and 0.04 moles/moles phosphor). CaCO$_3$ was used as a reactant to add Ca$^{2+}$ cation in the samples with higher DAP levels. Table 12 below lists the reactant mole ratios and weights for Examples 28-31. Table 13 provides the DAP and Pr$^{3+}$ levels, and integrated UVC emission intensities between 210 nm-310 nm, relative to LaPO$_4$:Pr and YPO$_4$:Pr controls, under 172 nm excitation.

Examples 28-31 when fired at 1100° C. emitted with primarily low-temperature β-phase character and when fired at 1200° C. emitted with primarily α-phase character under 172 nm excitation. The effect of the DAP level on brightness was negligible over the range studied and the examples with a higher Pr$^{3+}$ activator content were slightly brighter.

TABLE 12

| | Reactant | CaHPO$_4$ | DAP | CaCO$_3$ | Na$_2$CO$_3$ | Pr$_4$O$_7$ |
|---|---|---|---|---|---|---|
| Example 28 | mole ratio | 1.88 | 0.12 | 0 | 0.015 | 0.0075 |
| | weight (g) | 142.17 | 8.75 | 0.00 | 0.87 | 2.79 |
| Example 29 | mole ratio | 1.86 | 0.14 | 0 | 0.020 | 0.010 |
| | weight (g) | 140.66 | 10.21 | 0.00 | 1.17 | 3.72 |

TABLE 12-continued

| | Reactant | CaHPO$_4$ | DAP | CaCO$_3$ | Na$_2$CO$_3$ | Pr$_4$O$_7$ |
|---|---|---|---|---|---|---|
| Example 30 | mole ratio | 1.82 | 0.18 | 0.06 | 0.015 | 0.0075 |
| | weight (g) | 137.63 | 13.12 | 3.32 | 0.87 | 2.79 |
| Example 31 | mole ratio | 1.82 | 0.18 | 0.04 | 0.020 | 0.010 |
| | weight (g) | 137.63 | 13.12 | 2.21 | 1.17 | 3.72 |

TABLE 13

| | moles/mole phosphor | | Relative UVC Intensity under 172 nm radiation | |
|---|---|---|---|---|
| | | | relative to LaPO$_4$:Pr (fired at | relative to LaPO$_4$:Pr (fired at |
| | DAP level | Pr level | 1100° C.) | 1200° C.) |
| Example 28 | 0.12 | 0.03 | 95% | 116% |
| Example 29 | 0.14 | 0.04 | 101% | 119% |
| Example 30 | 0.18 | 0.03 | 92% | 112% |
| Example 31 | 0.18 | 0.04 | 102% | 120% |

Table 14 lists the integrated UVC emission intensities between 210 nm-310 nm for the selected α-Ca$_2$P$_2$O$_7$:Pr and β-Ca$_2$P$_2$O$_7$:Pr phosphors (relative to LaPO$_4$:Pr and YPO4:Pr controls under 172 nm excitation). Germicidal activity was calculated by multiplying the DIN germicidal activity curve (FIG. 1) by the emission data for the phosphor relative to LaPO$_4$:Pr. The data show that the Ca$_2$P$_2$O$_7$:Pr phosphors in general can be expected to have a germicidal activity at least as effective as the LaPO$_4$:Pr phosphor and that the α-Ca$_2$P$_2$O$_7$:Pr phosphor can be expected to have a significantly greater germicidal activity compared to the LaPO$_4$:Pr phosphor.

TABLE 14

| Phosphor | Example | Relative UVC Intensity under 172 nm radiation | | Germicidal Activity |
|---|---|---|---|---|
| | | relative to LaPO$_4$:Pr | relative to YPO$_4$:Pr | |
| β-Ca$_2$P$_2$O$_7$:Pr | Example 31 (fired at 1100° C.) | 102% | 144% | 98% |
| β-Ca$_2$P$_2$O$_7$:Pr + α-Ca$_2$P$_2$O$_7$:Pr | Example 21 (fired at 1100° C.) | 108% | 153% | 105% |
| α-Ca$_2$P$_2$O$_7$:Pr | Example 20 (fired at 1200° C.) | 127% | 179% | 125% |
| YPO$_4$:Pr | NA | 71% | 100% | 70% |
| LaPO$_4$:Pr | NA | 100% | 141% | 100% |

EXAMPLES 32-43

Sr$_2$P$_2$O$_7$:Pr Phosphors

Sr$_2$P$_2$O$_7$:Pr phosphors may be prepared similar to the Ca$_2$P$_2$O$_7$:Pr phosphors. The reactants preferably include strontium hydrogen phosphate (SrHPO$_4$), diammonium hydrogen phosphate ((NH$_4$)$_2$HPO$_4$), sodium carbonate (Na$_2$CO$_3$), and praseodymium oxide (Pr$_4$O$_7$).

Examples 32-35 were prepared and fired at 750° C., 1000° C., and 1150° C. under a reducing atmosphere to form Sr$_2$P$_2$O$_7$:Pr phosphors. The phosphors were then processed and analyzed in the same fashion as the previous examples. These examples were designed to investigate the effects of varying the $Pr^{3+}$ activator levels and firing temperatures on this phosphor system. The preferred stoichiometry of 1.0 moles of anion $[P_2O_7]^{4-}$ to 1.94 moles of total cation was used along with four levels of $Pr^{3+}$ activator (0.02, 0.04, 0.08 and 0.12 moles Pr/moles phosphor). Table 15 below lists the reactant mole ratios and weights. Table 16 provides the $Pr^{3+}$ levels, and integrated emission intensities between 180 nm-340 nm for the $Sr_2P_2O_7$:Pr phosphors under 172 nm excitation relative to a $LaPO_4$:Pr control.

All Examples 32-35 emitted with the high temperature α-phase character under 172 nm excitation. The activator level which gave the greatest intensity at the 1000° C. and 1150° C. firing temperatures was 0.04 moles of $Pr^{3+}$ per mole of phosphor. The 1000° C. firing temperature resulted in phosphors which were slightly more intense than those fired at 1150° C. The phosphors formed at 750° C. were significantly less intense than the phosphors formed at 1000° C. and 1150° C.

TABLE 15

| Reactant | | SrHPO₄ | DAP | Na₂CO₃ | Pr₄O₇ |
|---|---|---|---|---|---|
| Example 32 | mole ratio | 1.90 | 0.10 | 0.010 | 0.005 |
| | weight (g) | 190.37 | 7.16 | 0.57 | 1.82 |
| Example 33 | mole ratio | 1.86 | 0.14 | 0.020 | 0.010 |
| | weight (g) | 186.36 | 10.02 | 1.14 | 3.65 |
| Example 34 | mole ratio | 1.78 | 0.22 | 0.040 | 0.020 |
| | weight (g) | 178.35 | 15.75 | 2.29 | 7.30 |
| Example 35 | mole ratio | 1.70 | 0.30 | 0.060 | 0.030 |
| | weight (g) | 170.33 | 21.48 | 3.43 | 10.95 |

TABLE 16

| | | Relative UVC Intensity under 172 nm radiation relative to LaPO₄:Pr | | |
|---|---|---|---|---|
| | moles Pr/mole phosphor | Fired at 1150° C. | Fired at 1000° C. | Fired at 750° C. |
| Example 32 | 0.02 | 98% | 100% | 11% |
| Example 33 | 0.04 | 100% | 105% | 22% |
| Example 34 | 0.08 | 90% | 91% | 36% |
| Example 35 | 0.12 | 76% | 79% | 48% |

Examples 36-43 were prepared and fired at 1050° C., 1100° C., and 1150° C. under a reducing atmosphere to form $Sr_2P_2O_7$:Pr phosphors. The phosphors were then processed and analyzed in the same fashion as the previous samples. The preferred stoichiometry of 1.0 moles of anion $[P_2O_7]^{4-}$ to 1.94 moles of total cation was used along with eight levels of $Pr^{3+}$ activator (0.01, 0.02, 0.03, 0.04, 0.05, 0.06, 0.07 and 0.08 moles Pr/moles phosphor). Table 17 below lists the reactant mole ratios and weights used for Examples 36-43. Table 18 gives the $Pr^{3+}$ levels and integrated emission intensities between 180 nm-340 nm for the $Sr_2P_2O_7$:Pr phosphors samples under 172 nm excitation relative to a $LaPO_4$:Pr control.

All of the $Sr_2P_2O_7$:Pr phosphors emitted with the high temperature α-phase character under 172 nm excitation. The emission intensities of Examples 37, 39, and 43 were found to be slightly lower than the intensities of the comparable Examples 32, 33, and 34 when fired at 1150° C. Presumably this was due to a change in the specific lot of the SrHPO₄ reactant that was used. The activator levels between 0.03 and 0.06 moles Pr/mole phosphor gave good intensities at all firing temperatures. The phosphor prepared with 0.07 moles Pr/mole of phosphor and fired at 1100° C. exhibited the highest emission intensity.

TABLE 17

| Reactant | | SrHPO₄ | DAP | Na₂CO₃ | Pr₄O₇ |
|---|---|---|---|---|---|
| Example 36 | mole ratio | 1.92 | 0.08 | 0.005 | 0.0025 |
| | weight (g) | 192.38 | 5.73 | 0.29 | 0.91 |
| Example 37 | mole ratio | 1.90 | 0.10 | 0.010 | 0.005 |
| | weight (g) | 190.37 | 7.16 | 0.57 | 1.82 |
| Example 38 | mole ratio | 1.88 | 0.12 | 0.015 | 0.0075 |
| | weight (g) | 188.37 | 8.59 | 0.86 | 2.74 |
| Example 39 | mole ratio | 1.86 | 0.14 | 0.020 | 0.010 |
| | weight (g) | 186.36 | 10.02 | 1.14 | 3.65 |
| Example 40 | mole ratio | 1.84 | 0.16 | 0.025 | 0.0125 |
| | weight (g) | 184.36 | 11.45 | 1.43 | 4.56 |
| Example 41 | mole ratio | 1.82 | 0.18 | 0.030 | 0.015 |
| | weight (g) | 182.36 | 12.89 | 1.72 | 5.47 |
| Example 42 | mole ratio | 1.80 | 0.20 | 0.035 | 0.0175 |
| | weight (g) | 180.35 | 14.32 | 2.00 | 6.38 |
| Example 43 | mole ratio | 1.78 | 0.22 | 0.040 | 0.020 |
| | weight (g) | 178.35 | 15.75 | 2.29 | 7.30 |

TABLE 18

| | | Relative UVC Intensity under 172 nm radiation relative to LaPO₄:Pr | | |
|---|---|---|---|---|
| | moles Pr/mole phosphor | Fired at 1050° C. | Fired at 1100° C. | Fired at 1150° C. |
| Example 36 | 0.03 | 77% | 66% | 75% |
| Example 37 | 0.04 | 88% | 85% | 87% |
| Example 38 | 0.05 | 89% | 91% | 91% |
| Example 39 | 0.06 | 92% | 96% | 92% |
| Example 40 | 0.07 | 89% | 98% | 92% |
| Example 41 | 0.08 | 89% | 96% | 90% |
| Example 42 | 0.09 | 88% | 90% | 88% |
| Example 43 | 0.10 | 85% | 89% | 86% |

EXAMPLES 44-50

$(Ca_{2-x}Sr_x)P_2O_7$:Pr Phosphors $(Ca_{2-x}Sr_x)P_2O_7$:Pr phosphors may be prepared similar to the $Ca_2P_2O_7$:Pr phosphors. The reactants preferably include calcium hydrogen phosphate, (CaHPO₄), strontium hydrogen phosphate (SrHPO₄), diammonium hydrogen phosphate ((NH₄)₂HPO₄), sodium carbonate (Na₂CO₃), and praseodymium oxide (Pr₄O₇).

Examples 44-50 were prepared and fired at 1000° C., 1100° C., and 1200° C. under a reducing atmosphere to form $(Ca_{2-x}Sr_x)P_2O_7$:Pr phosphors. The phosphors were then processed and analyzed in the same fashion as the previous samples. The preferred stoichiometry of 1.0 moles of anion $[P_2O_7]^{4-}$ to 1.94 moles of total cation was used along with a constant $Pr^{3+}$ activator level of 0.04 moles Pr/moles phosphor. Table 19 below lists the reactant mole ratios and weights used for Examples 44-50. Table 20 gives the ratio, expressed as a percentage, of the number of moles Sr to the total number of moles of Sr and Ca. Table 20 also provides the integrated emission intensities between 180 nm-340 nm for the $(Ca_{2-x}Sr_x)P_2O_7$:Pr phosphors under 172 nm VUV excitation relative to a $LaPO_4$:Pr control as well as the phase identity of the phosphors fired at 1000° C. as determined by x-ray diffraction (XRD). Table 21 lists the peak wavelengths for the most intense emission peaks of the phosphors under 172 nm excitation.

These phosphors were prepared to investigate the effects of varying the $Sr^{2+}/Ca^{2+}$ cation ratios and firing temperatures. Since the $\alpha\text{-}Sr_2P_2O_7$:Pr and $\alpha\text{-}Ca_2P_2O_7$:Pr phosphors form with the same structure, complete solid solution behavior was expected. X-ray diffraction analysis of the phosphors corroborated this expectation. For phosphors fired at 1200° C., the emission intensities under VUV excitation increased continuously as the $Ca^{2+}$ content increased. The mixed $Sr^{2+}/Ca^{2+}$ phosphors exhibited the highest emission intensities under VUV excitation when fired at 1000° C. The peak wavelengths of the most intense emission peaks under VUV excitation also increased continuously as the $Ca^{2+}$ content increased for all examples.

TABLE 19

| Reactant | | $SrHPO_4$ | $CaHPO_4$ | DAP | $Na_2CO_3$ | $Pr_4O_7$ |
|---|---|---|---|---|---|---|
| Example 44 | mole ratio | 0 | 1.860 | 0.14 | 0.02 | 0.01 |
| | weight (g) | 0 | 153.44 | 11.14 | 1.27 | 4.05 |
| Example 45 | mole ratio | 0.186 | 1.674 | 0.14 | 0.02 | 0.01 |
| | weight (g) | 20.71 | 138.10 | 11.14 | 1.27 | 4.05 |
| Example 46 | mole ratio | 0.465 | 1.395 | 0.14 | 0.02 | 0.01 |
| | weight (g) | 51.77 | 115.08 | 11.14 | 1.27 | 4.05 |
| Example 47 | mole ratio | 0.930 | 0.930 | 0.14 | 0.02 | 0.01 |
| | weight (g) | 103.54 | 76.72 | 11.14 | 1.27 | 4.05 |
| Example 48 | mole ratio | 1.395 | 0.465 | 0.14 | 0.02 | 0.01 |
| | weight (g) | 155.30 | 38.36 | 11.14 | 1.27 | 4.05 |
| Example 49 | mole ratio | 1.674 | 0.186 | 0.14 | 0.02 | 0.01 |
| | weight (g) | 186.36 | 15.34 | 11.14 | 1.27 | 4.05 |
| Example 50 | mole ratio | 1.860 | 0 | 0.14 | 0.02 | 0.01 |
| | weight (g) | 207.07 | 0 | 11.14 | 1.27 | 4.05 |

TABLE 20

| | | Relative UVC Intensity under 172 nm radiation relative to $LaPO_4$:Pr | | | XRD Phase Analysis of Phosphors |
|---|---|---|---|---|---|
| | % Sr | Fired at 1000° C. | Fired at 1100° C. | Fired at 1200° C. | Fired at 1000° C. |
| Example 44 | 0% | 102% | 99% | 116% | beta |
| Example 45 | 10% | 110% | 109% | 113% | major beta minor alpha |
| Example 46 | 25% | 116% | 110% | 110% | major alpha minor beta |
| Example 47 | 50% | 116% | 110% | 106% | major alpha (broad peaks) |
| Example 48 | 75% | 109% | 106% | 103% | major alpha (broad peaks) |
| Example 49 | 90% | 106% | 102% | 101% | alpha |
| Example 50 | 100% | 90% | 94% | 95% | alpha |

TABLE 21

| | | Peak Wavelengths of Most Intense Peaks | | |
|---|---|---|---|---|
| | % Sr | Fired at 1000° C. | Fired at 1100° C. | Fired at 1200° C. |
| Example 44 | 0% | 236 nm | 236 nm | 240 nm |
| | | | | 231 nm |
| Example 45 | 10% | 237.5 nm | 239 nm | 239 nm |
| | | | 230 nm | 230 nm |
| Example 46 | 25% | 238 nm | 238 nm | 238 nm |
| | | | 229 nm | 229 nm |
| Example 47 | 50% | 237 nm | 237 nm | 237.5 nm |
| Example 48 | 75% | 236 nm | 236 nm | 236 nm |

TABLE 21-continued

| | | Peak Wavelengths of Most Intense Peaks | | |
|---|---|---|---|---|
| | % Sr | Fired at 1000° C. | Fired at 1100° C. | Fired at 1200° C. |
| Example 49 | 90% | 234.5 nm | 234.5 nm | 235 nm |
| Example 50 | 100% | 234 nm | 234 nm | 234 nm |

Figure 7:
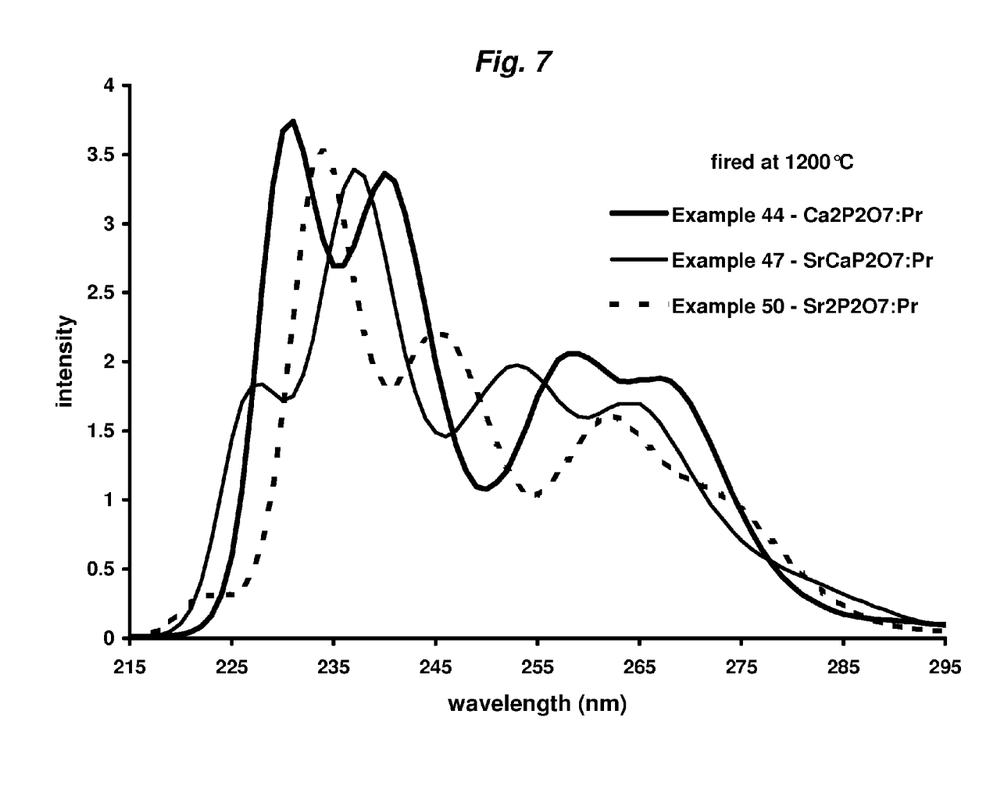
FIG. 7 is a graph of the UVC emission spectra of Examples 44, 47 and 50 under excitation by 172 nm radiation.
Figure 8:
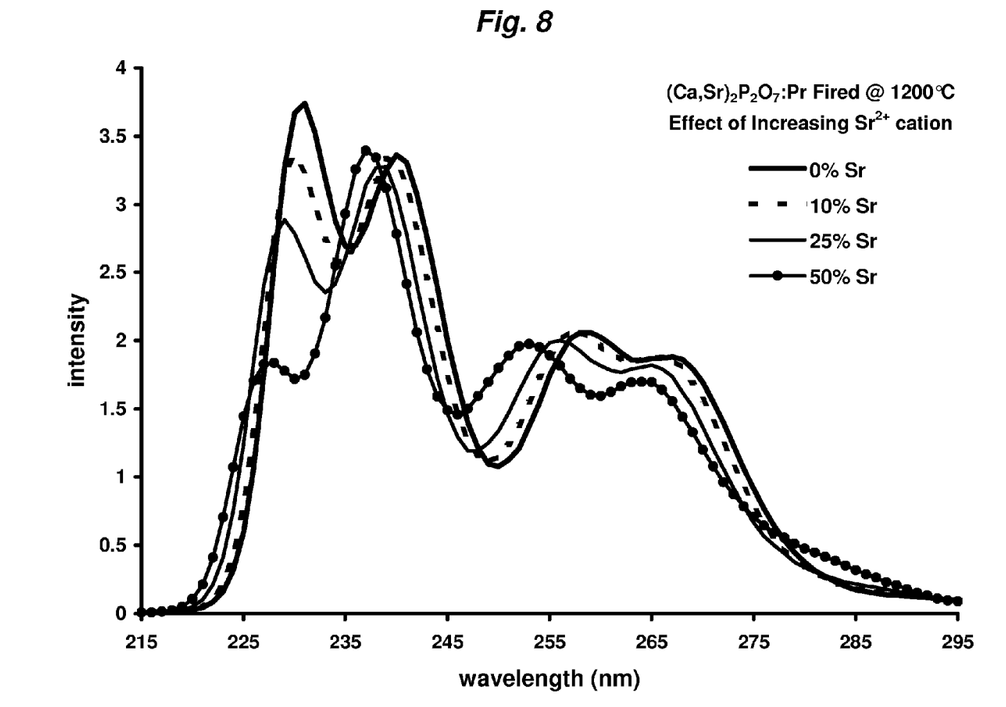
FIG. 8 shows the change in the UVC emission of the phosphor of this invention under 172 nm excitation as the percentage of the strontium cation is increased from 0% to 50%.
Figure 9:
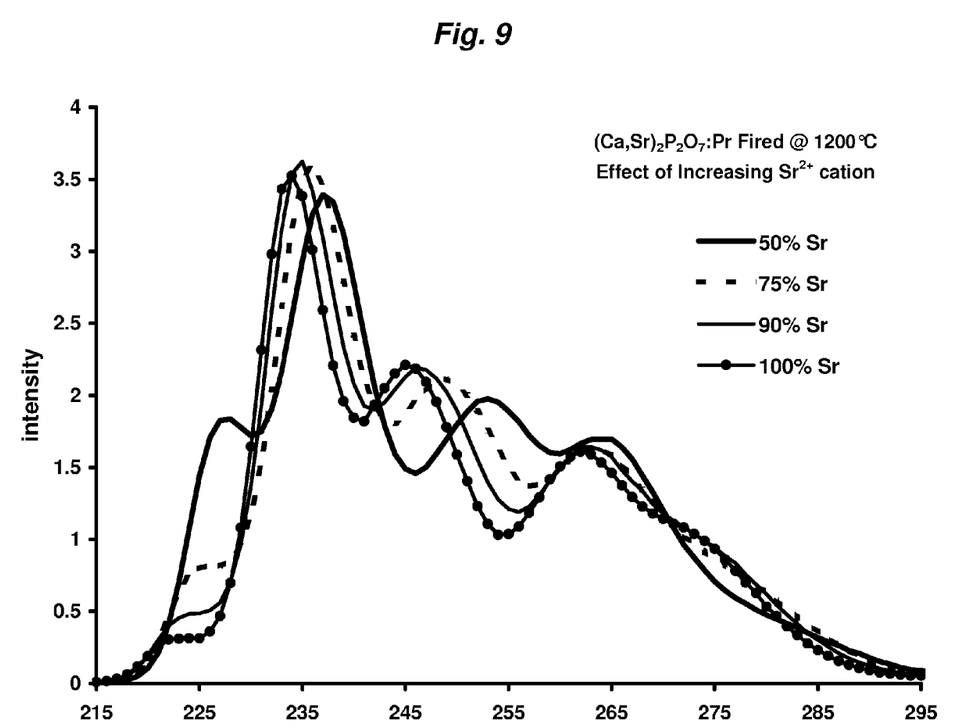
FIG. 9 shows the change in the UVC emission of the phosphor of this invention under 172 nm excitation as the percentage of the strontium cation is increased from 50% to 100%.

FIG. 7 shows the UVC emission spectra of Examples 44, 47, and 50 under 172 nm excitation. All three phosphors were formed by firing at 1200° C. The UVC emission of the phosphors indicates $\alpha$-phase materials. FIG. 7 also shows how the UVC emission can vary depending on the composition. Example 44 contained no $Sr^{2+}$ and Example 50 contained no $Ca^{2+}$. Example 47 contained equal amounts of the two cations. FIGS. 8 and 9 better demonstrate the changes in the UVC emission as the percentage of the $Sr^{2+}$ cation is increased.

ULTRAVIOLET-EMITTING LAMP

Figure 10:
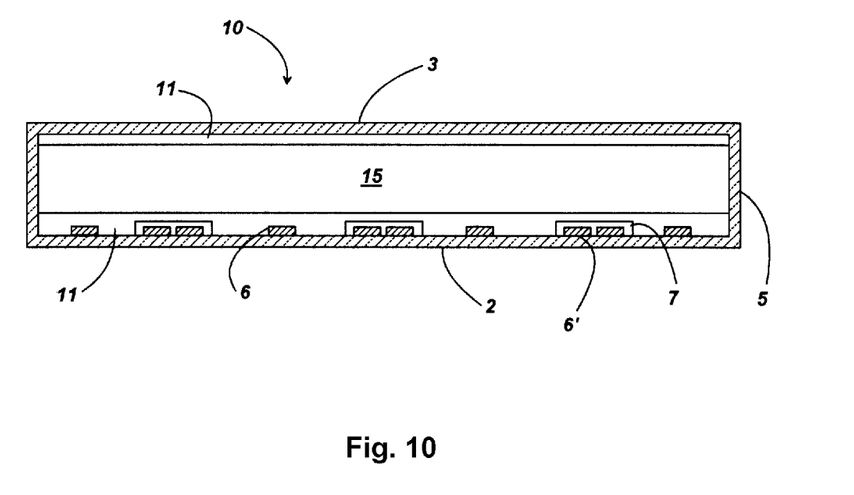
FIG. 10 is a cross-sectional illustration of a lamp containing the phosphor of this invention.

FIG. 10 illustrates a type of VUV-excited device which is generally referred to as a dielectric barrier discharge lamp. The flat rectangular-shaped device is shown in cross section. The discharge vessel 10 is constructed of a transparent material such as glass and comprises a front plate 3 and a back plate 2 which are joined by frame 5 at the periphery of the plates. The discharge vessel 10 encloses discharge chamber 15 which contains a rare gas, typically xenon, or mixture of rare gases, and is used to generate a discharge which emits vacuum ultraviolet (VUV) radiation. A preferred discharge is a Xe-excimer discharge which emits VUV radiation at about 172 nm. The back plate 2 has multiple strip electrodes 6 which may serve as anodes and cathodes during operation. At least some of the electrodes 6' are covered with a dielectric barrier layer 7. Further examples of dielectric barrier discharge lamps are described in U.S. Pat. Nos. 6,566,810, 6,246,171 and 6,469,435.

In a preferred embodiment, the UV-emitting lamp may be formed by coating the inner surface of the top plate 3 and back plate 2 with a phosphor layer 11 that contains the UV-emitting phosphor of this invention. The UV-emitting phosphor converts at least some of the VUV radiation from the gas discharge into longer wavelength UV radiation. More preferably, the lamp emits UVC radiation which may be used for germicidal applications.

While there have been shown and described what are present considered to be the preferred embodiments of the invention, it will be apparent to those skilled in the art that various changes and modifications can be made herein without departing from the scope of the invention as defined by the appended claims.

We claim:

1. A UV-emitting phosphor having a composition represented by a formula $(Ca_{2-x},Sr_x)P_2O_7$:Pr where $0 \leq x \leq 2$.

2. The phosphor of claim 1 wherein the phosphor emits ultraviolet radiation under excitation by vacuum ultraviolet radiation.

3. The phosphor of claim 1 wherein the phosphor emits ultraviolet radiation under excitation by a Xe-excimer discharge.

4. The phosphor of claim 1 wherein the phosphor exhibits a peak emission in a wavelength range from about 230 nm to about 240 nm.

5. A UV-emitting phosphor having a composition represented by a formula $Ca_{(2-w-x-y-z)}Sr_xA_yPr_zP_2O_7$ where: A is a 1+ metal cation; w ranges from 0 to about 0.1; x ranges from 0 to 2-w-y-z; y ranges from 0 to about 0.25; and z ranges from greater than 0 to about 0.12.

6. The phosphor of claim 5 wherein A is $Na^+$.

7. The phosphor of claim 5 wherein y ranges from z−0.01 to z+0.01.

8. The phosphor of claim 5 wherein z ranges from about 0.02 to about 0.08.

9. The phosphor of claim 5 wherein y=z.

10. A UV-emitting phosphor having a composition represented by a formula $Ca_{(2-w-x-y-z)}Sr_xNa_yPr_zP_2O_7$ where: w ranges from 0 to about 0.1; x ranges from 0 to 2-w-y-z; y ranges from 0 to about 0.25; and z ranges from greater than 0 to about 0.12.

11. The phosphor of claim 10 wherein y ranges from z−0.01 to z+0.01.

12. The phosphor of claim 10 wherein z ranges from about 0.02 to about 0.08.

13. The phosphor of claim 10 wherein y=z.

14. The phosphor of claim 10 wherein w=0.06.

15. The phosphor of claim 14 wherein y=z.

16. A UV-emitting phosphor comprising praseodymium-activated calcium strontium pyrophosphate.

17. A UV-emitting phosphor comprising praseodymium-activated calcium pyrophosphate.

18. The phosphor of claim 17 wherein the phosphor has a composition represented by a formula $Ca_{(2-w-y-z)}A_yPr_zP_2O_7$ where: A is a 1+ metal cation; w ranges from 0 to about 0.1; y ranges from 0 to about 0.25; and z ranges from greater than 0 to about 0.12.

19. The phosphor of claim 18 wherein the phosphor is a β-phase calcium pyrophosphate and z ranges from about 0.04 to about 0.12.

20. The phosphor of claim 18 wherein the phosphor is an α-phase calcium pyrophosphate and z ranges from about 0.02 to about 0.08.

21. The phosphor of claim 18 wherein A is $Na^+$.

22. A UV-emitting phosphor comprising praseodymium-activated strontium pyrophosphate.

23. The phosphor of claim 22 wherein the phosphor has a composition represented by a formula $Sr_{(2-w-y-z)}A_yPr_zP_2O_7$ where: A is a 1+ metal cation; w ranges from 0 to about 0.1; y ranges from 0 to about 0.25; and z ranges from about 0.03 to about 0.08.

24. The phosphor of claim 22 wherein the phosphor is an α-phase strontium pyrophosphate.

25. The phosphor of claim 23 wherein y=z.

26. A UV-emitting lamp comprising a discharge vessel containing a source of vacuum ultraviolet radiation and a UV-emitting phosphor on an interior wall of the discharge vessel, the UV-emitting phosphor having a composition represented by a formula $(Ca_{2-x},Sr_x)P_2O_7:Pr$ where $0 \leq x \leq 2$.

27. The UV-emitting lamp of claim 26 wherein the source of vacuum ultraviolet radiation is a xenon excimer discharge.

28. The UV-emitting lamp of claim 27 wherein the discharge vessel has dielectrically impeded electrodes.

29. The phosphor of claim 1 wherein the phosphor is formulated to have a slight molar excess of pyrophosphate anion relative to the total cation amount.

30. The phosphor of claim 1 wherein the phosphor is formulated to have a ratio of 1.00 moles of pyrophosphate anion to 1.94 moles of cation.

31. The phosphor of claim 1 wherein the phosphor has a mixture of α- and β-phases.

\* \* \* \* \*